US006964048B1

(12) United States Patent
Isham

(10) Patent No.: US 6,964,048 B1
(45) Date of Patent: Nov. 8, 2005

(54) METHOD FOR DYNAMIC LOANING IN RATE MONOTONIC REAL-TIME SYSTEMS

(75) Inventor: Karl Michael Isham, Grantsville, UT (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/481,771

(22) Filed: Jan. 11, 2000

Related U.S. Application Data
(60) Provisional application No. 60/129,301, filed on Apr. 14, 1999.

(51) Int. Cl.$^7$ .................................................. G06F 9/00
(52) U.S. Cl. ...................... 718/104; 718/100; 718/102; 718/103; 718/105; 718/106; 718/107
(58) Field of Search .......................... 709/100, 102–108

(56) References Cited

U.S. PATENT DOCUMENTS

| | | | | |
|---|---|---|---|---|
| 6,108,683 A | * | 8/2000 | Kamada et al. ............. | 709/103 |
| 6,189,022 B1 | * | 2/2001 | Binns ........................ | 709/100 |
| 6,272,517 B1 | * | 8/2001 | Yue et al. ................... | 709/102 |
| 6,438,573 B1 | * | 8/2002 | Nilsen ....................... | 709/100 |

OTHER PUBLICATIONS

Lui Sha et al; "Mode Change Protocols for Priority–Driven Preemptive Scheduling" Real Time Sysems, NL, Kluwer Academic Publishers, Dordrecht, vol. 1, No. 3, Dec. 1, 1989.*

Paul Richardson, Susanta Sarkar; "Adaptive Scheduling: Overload Scheduling for Mission Critical Systems"; U.S. Army Tank–Automotive Research, Development, and Engineering Center.*

Lui Sha et al: "Mode Change Protocols for Priority–Driven Preemptive Scheduling" Real Time Systems, NL, Kluwer Academic Publishers, Dordrecht, vol. 1, No. 3, Dec. 1, 1998, pp. 243–264.

"Scheduling Algorithms for Multiprogramming in a Hard–Real–Time Environment", by Liu and Layland, Journal of the Association for Computing machinery, vol. 20. No. 1, Jan. 1973, pp. 46–61.

"A Practitioner's Handbook for Real–Time Analysis: Guide to Rate Monotonic Analysis for Real–Time Systems", by M. Klein et al, Kluwer Academic Publishers, 1993. ISBN 0–7923–9361–9.

* cited by examiner

Primary Examiner—Meng-Al T. An
Assistant Examiner—Syed J Ali

(57) ABSTRACT

A method and apparatus are disclosed for sharing execution capacity among tasks executing in a real-time computing system. The present invention extends RMA techniques for characterizing system timing behavior and designing real-time systems. A high priority task having hard deadlines is paired with a lower priority task having soft deadlines. During an overload condition, the higher priority task can dynamically borrow execution time from the execution capacity of the lower priority task without affecting the schedulability of the rest of the system. The higher priority task is bolstered in a proportion to the capacity borrowed from the lower priority task, so that the combined utilization of the two tasks remains constant. The period of the degraded task is increased to compensate for the execution time that was loaned to the higher priority task. In addition, the priority of the lower priority task is modified to match the new period.

19 Claims, 2 Drawing Sheets

METHOD FOR DYNAMIC LOANING IN RATE MONOTONIC REAL-TIME SYSTEMS

CROSS REFERENCE TO RELATED APPLICATIONS

This application claims the benefit of U.S. Provisional Application No. 60/129,301, filed Apr. 4, 1999.

FIELD OF THE INVENTION

The present invention relates to the timing behavior of real-time computing systems, and more particularly, to a method and apparatus for loaning execution capacity among tasks executing in a real-time computing system.

BACKGROUND OF THE INVENTION

Real-time systems differ from other forms of computing in that they must be temporally correct as well as logically correct. Such systems are developed to satisfy the following three primary criteria: guaranteed timing deadlines, fast response times, and stability in overload. Schedulability describes the capacity of a system. A system that is schedulable can meet all of its critical timing deadlines. Latency describes the responsiveness of a system. In a real-time system, it is the worst-case system response time to events that matters. Stability in overload means the system is able to meet its critical deadlines even if all deadlines cannot be met.

One of the most useful models available for developing real-time computing systems is Rate Monotonic Analysis (RMA). RMA provides a mathematical framework for reasoning about system timing behavior and provides an engineering basis for designing real-time systems. RMA was first disclosed in Liu & Layland, "Scheduling Algorithms for Multi-Programming in a Hard Real-Time Environment," Journal of the Ass'n of Computing Machinery (ACM) 20, 1, 40–61 (January, 1973), incorporated by reference herein. Generally, Liu and Layland demonstrated that a set of n periodic tasks with deadlines at the end of their periods will meet their deadlines if they are arranged in priority according to their periods, and they meet a schedulability bound test. Since this paper, RMA has evolved into a collection of methods that have extended the original theory from its original form. The basic RMA real-time guarantee, however, has remained unchanged. For a general discussion of these collections of methods, see, for example, Klein et al, A Practitioner's Handbook for Real-Time Analysis: Guide to Rate Monotonic Analysis for Real-time Systems (Kluwer Academic Publishing, ISBN 0-7923-9361-9, 1993), incorporated by reference herein.

Methods currently exist to assess spare capacity and dynamically change the priority of tasks to alter the scheduling policy of the system. Spare capacity is the amount of execution time that can be added to the response of an event while preserving the schedulability of lower priority events. A related method, eliminating overrun, computes the amount of resource usage that must be eliminated to allow an event to meet its deadlines. See, Klein et al, A Practitioner's Handbook for Real-Time Analysis: Guide to Rate Monotonic Analysis for Real-time Systems, Chapter 4, Group 3 (Kluwer Academic Publishing, ISBN 0-7923-9361-9, 1993). Changing the priority of a task is used in various synchronization protocols to avoid priority inversion when multiple tasks share common data.

The validity of Rate Monotonic Analysis depends on preparing for the worst-case in terms of individual event timing and the concurrence of events. In other words, the system will be capable of meeting all of its deadlines if all worst-case events can be handled simultaneously. While mathematically certain, assuming worst-case timings and coincidences required by the RMA analysis may result in harsh feature/performance tradeoffs for the usually limited hardware computing capacity found in a typical real-time system. While the worst-case high priority event may occur very infrequently, the execution time for the worst-case high priority event must still be accounted for in RMA calculations. The capacity allocated to handle this rare worst-case event at high priority then gets traded off against the capacity available to lower priority events.

If RMA calculations show that the system is no longer schedulable with these maximum execution requirements, the designer is left with few options. Usually, the worst-case events will have to be redesigned to reduce their execution times. If the execution times cannot be reduced, the designer is left with discounting the offending event as an overload, provided the occasional timing violations to lower priority events can be tolerated. An overload condition is an acceptable alternative only if all lower priority events have soft deadlines (can tolerate a missed deadline occasionally). Unfortunately, this is rarely the case. In a system where such an overload situation exists, the real-time criteria of stability in overload is violated.

Currently, RMA only provides the tools necessary to determine if a system is schedulable. In other words, RMA will only tell you if a given design will work or not. For example, the method of assessing spare capacity is useful for determining how much execution time can be safely added to an event before timing requirements are broken. Likewise, RMA provides a method for determining how much execution time must be eliminated to meet timing requirements. These methods will prove useful for providing target values for redesign, but will not help if the execution times are intractable. There is no current method that allows a designer to gracefully handle intractable overloads.

SUMMARY OF THE INVENTION

Generally, a method and apparatus are disclosed for sharing execution capacity among tasks executing in a real-time computing system by pairing a high priority task having hard deadlines with a lower priority task having soft deadlines. The present invention extends RMA techniques for characterizing system timing behavior and designing real-time systems. During an overload condition, the higher priority task can dynamically borrow execution time from the execution capacity of the lower priority task without affecting the schedulability of the rest of the system. The higher priority task is bolstered in proportion to the capacity borrowed from the lower priority task, so that the combined utilization of the two tasks remains constant.

According to another aspect of the invention, the period of the degraded task is increased to compensate for the execution time that was loaned to the higher priority task. Thus, events for the degraded task may still be assigned according to the original execution budget, but are allowed a longer time to complete due to the increased work in the borrowing higher priority task. In addition, the priority of the lower priority task is modified to match the new period, in accordance with the Rate Monotonic Scheduling algorithm.

The present invention isolates effects of an overload to a particular task (i.e., the degraded task). In addition, the manner in which execution capacity is borrowed does not diminish the original execution budget of the degraded task, since the period of the degraded task is lengthened to compensate for the borrowed time. Thus, the overloaded system takes longer to perform non-critical events but the amount of work it will accept at any one time remains the same. In addition, the present invention provides better utilization of computing resources by borrowing non-overload execution time against the capacity of a rarely used task. In this case, a low priority task may be prepared to handle an intermittent event with soft deadlines. The present invention permits a higher priority task to borrow some of the capacity for its normal operation from the intermittent task.

A more complete understanding of the present invention, as well as further features and advantages of the present invention, will be obtained by reference to the following detailed description and drawings.

DETAILED DESCRIPTION

Figure 1:
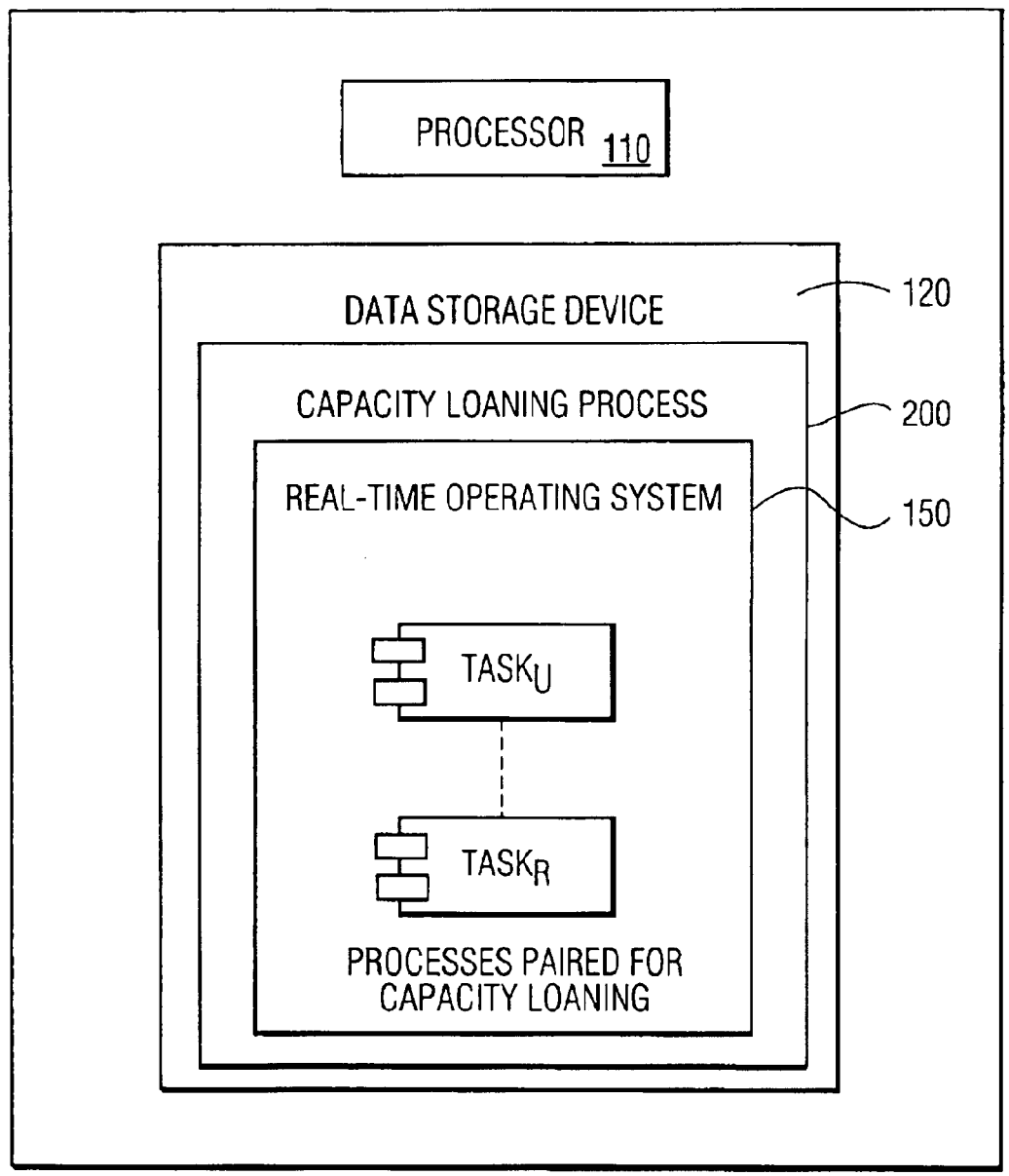
FIG. 1 illustrates a real-time computing system in accordance with the present invention.

The present invention provides a method for pairing a high priority task having hard deadlines with a lower priority task with soft deadlines. During an overload, the higher priority task can dynamically borrow execution time from the execution capacity of the lower priority task without affecting the schedulability of the rest of the system. In this manner, the higher priority task can be bolstered in a proportional manner, so that the combined utilization of the two tasks remains constant.

According to another aspect of the present invention, the period of the degraded loaning task is lengthened to compensate for the borrowed time. In addition, the priority of the degraded task is modified to match the new period. Furthermore, the performance of the loaning task is degraded for the period of the borrowing task, extended over the whole period of the loaning task.

The present invention provides a means to gracefully degrade system performance during overload while still providing critical schedulability guarantees. For intractable overloads, this may be the only practical method of maintaining stability. Secondly, the task to be degraded can be identified during the design stage, which is an important consideration from the standpoint of predictability and isolation. Real-time problems are notorious for their ability to elude capture in the field. If an overload event coincided with a different lower priority event every time it manifested itself, it would be nearly impossible to correctly identify and correct.

The present invention isolates the effects of an overload to a particular task. In addition, the means used by the present invention to borrow execution capacity does not diminish the original execution budget of the degraded task, since the period of the degraded task is lengthened to compensate for the borrowed time. Thus, the overloaded system takes longer to perform non-critical events but the amount of work it will accept at any one time remains the same. Finally, the method of the present invention can be used to provide better utilization of computing resources by borrowing non-overload execution time against the capacity of a rarely used task. In this case, a low priority task may be prepared to handle an intermittent event with soft deadlines. The present invention permits a higher priority task to borrow some of the capacity for its normal operation from the intermittent task.

RMA PRINCIPLES AND TERMINOLOGY

Schedulability Bound Test

As previously indicated, Liu and Layland demonstrated that a set of n periodic tasks with deadlines at the end of their periods will meet their deadlines if they are arranged in priority according to their periods, and they meet a schedulability bound test. For a detailed discussion of the schedulability bound test, see Liu & Layland, "Scheduling Algorithms for Multi-Programming in a Hard Real-Time Environment," Journal of the Ass'n of Computing Machinery (ACM) 20, 1, 40–61 (January, 1973), incorporated by reference herein.

Generally, the schedulability bound test states that a set of n independent periodic tasks scheduled by the rate monotonic algorithm will always meet its deadlines, for all task phasings, if:

$$\frac{C1}{T1} + \ldots + \frac{Cn}{Tn} \leq U(n) = n\left(2^{\frac{1}{n}} - 1\right)$$

where, $C_i$=worst-case task execution time of task$_i$, $T_i$=period of task$_i$, and $U(n)$=utilization for n tasks.

Mathematical Basis for this Invention

As previously indicated, the present invention pairs two tasks, a critical task with hard deadlines and another task of lower priority with soft deadlines. Consider a pair of tasks whose total utilization remains constant, thereby allowing RMA to be applied to guarantee schedulability. Such a pair might exist in a real-time system in order to satisfy two different quality of service levels. The task pair relationship can be expressed as follows:

$$\frac{Cu}{Tu} + \frac{Cr}{Tr} = U \qquad \text{Equation (1)}$$

where, $C_u$=worst-case task execution time of task$_u$, $T_u$=period of task$_u$, $C_r$=worst-case task execution time of task$_r$, $T_r$=period of task$_r$, and U=utilization for both tasks.

Thus, the utilization of one task in the pair may be increased if the utilization of the other task in the pair is proportionally decreased to maintain a constant utilization, U. In this manner, execution time can be borrowed from one task to supplement the execution of the other task. The techniques of the present invention are useful, for example, where events are validated against the available execution time, $C_u$ or $C_r$, before they are assigned to a servicing task, task$_u$ or task$_r$. It follows that temporary overloads may be assigned to the higher priority task without sacrificing RMA guarantees. The utilization loan can be expressed by the equation:

$$\frac{Cu + Nu}{Tu} + \frac{Cr - Nr}{Tr} = U \quad \text{(from equation (1))}$$

$$\frac{Cu}{Tu} + \frac{Nu}{Tu} + \frac{Cr}{Tr} - \frac{Nr}{Tr} = U$$

$$\frac{Nu}{Tu} - \frac{Nr}{Tr} = U - \frac{Cu}{Tu} - \frac{Cr}{Tr}$$

$$\frac{Nu}{Tu} - \frac{Nr}{Tr} = 0$$

$$\frac{Nu}{Tu} = \frac{Nr}{Tr} \quad \text{Equation (2)}$$

$$Nu = \frac{Nr \cdot Tu}{Tr}$$

where, $N_r$=amount of execution time to borrow from task$_r$, where $N_r < C_r$; and $N_u$=amount of execution time available to loan to task$_u$.

The utilization terms for the two tasks in question are isolated from the utilization bound equation and equated to their combined utilization. In the above discussion, task$_u$ refers to the higher priority (urgent) task while task$_r$ refers to the lower priority (routine) task with soft deadlines. For the RMA utilization bound test to remain valid, the sum of these two tasks must remain constant during the application of the method.

Given that the utilization, U, remains constant, the utilization of the higher priority task may be increased as long as there is a proportional decrease in the utilization of the lower priority task. The proportional change guarantees the schedulability of the rest of the system, since the net effect on the utilization bound equation is the same before and after the change. Equation (2) applies this proportional change and is solved for the amount of execution time the higher priority task may borrow.

While adding execution time to a task may have an application in handling overloads, it is usually not practical to actually remove execution time from another task to compensate for it. The execution times of most events at runtime are fixed, and therefore cannot be limited. This is solved by assuming that the original execution budget is fixed and letting the period of the task change instead. As discussed hereinafter, Equations (3) and (4) deal with this change in the loaning task's period. Since the period of a task also determines its priority in a Rate Monotonic environment, the priority of the task must change as well, using the usual set priority functions available in most real-time operating systems.

To compensate for the borrowed execution time, the period of the loaning task may be changed instead of limiting the execution time of the task. In this manner, the level of service in the loaning task is degraded gracefully. Events may still be assigned according to the original execution budget, $C_r$, but are allowed a longer time to complete due to the increased work in the borrowing task. The graceful degradation may be implemented as follows:

$$\frac{Cr}{Tn} = \frac{Cr - Nr}{Tr} \quad \text{Equation (3)}$$

$$Tn = \frac{Cr}{\left(\frac{Cr - Nr}{Tr}\right)}$$

$$Tn = \frac{Cr \cdot Tr}{Cr - Nr}$$

where

Tn=the new period of task$_r$.

To prevent an unbounded rise in the execution period of the task, Tn, Nr must be limited to a maximum loan amount where Nr<<Cr. If it is assumed that at its maximum value, Tn, is a multiple of Tr, then:

$$m \cdot Tr = \frac{Cr \cdot Tr}{Cr - Nm} \quad \text{Equation (4)}$$

$$m = \frac{Cr \cdot Tr}{(Cr - Nm) \cdot Tr}$$

$$m = \frac{Cr}{Cr - Nm}$$

$$Cr - Nm = \frac{Cr}{m}$$

$$Nm = Cr - \frac{Cr}{m}$$

$$Nm = Cr\left(1 - \frac{1}{m}\right)$$

where m=multiple of the period of task$_r$, and

Nm=maximum execution time, Nr, loanable from task$_r$.

FIG. 1 illustrates a real-time computing system 100 in accordance with the present invention. As shown in FIG. 1, the real-time computing system 100 includes certain standard hardware components, such as a processor 110 and a data storage device 120, such as a read-only memory and/or a random access memory (RAM).

The data storage device 120 includes a capacity loaning process 200, discussed further below in conjunction with FIG. 2. Generally, the capacity loaning process 200 implements capacity loaning between two tasks in accordance with the present invention. As shown in FIG. 1, the data storage device 120 also includes an operating system 150 that, among other things, manages the pairing of the two tasks, task$_U$ and task$_R$, for capacity loaning in accordance with the present invention.

Figure 2:
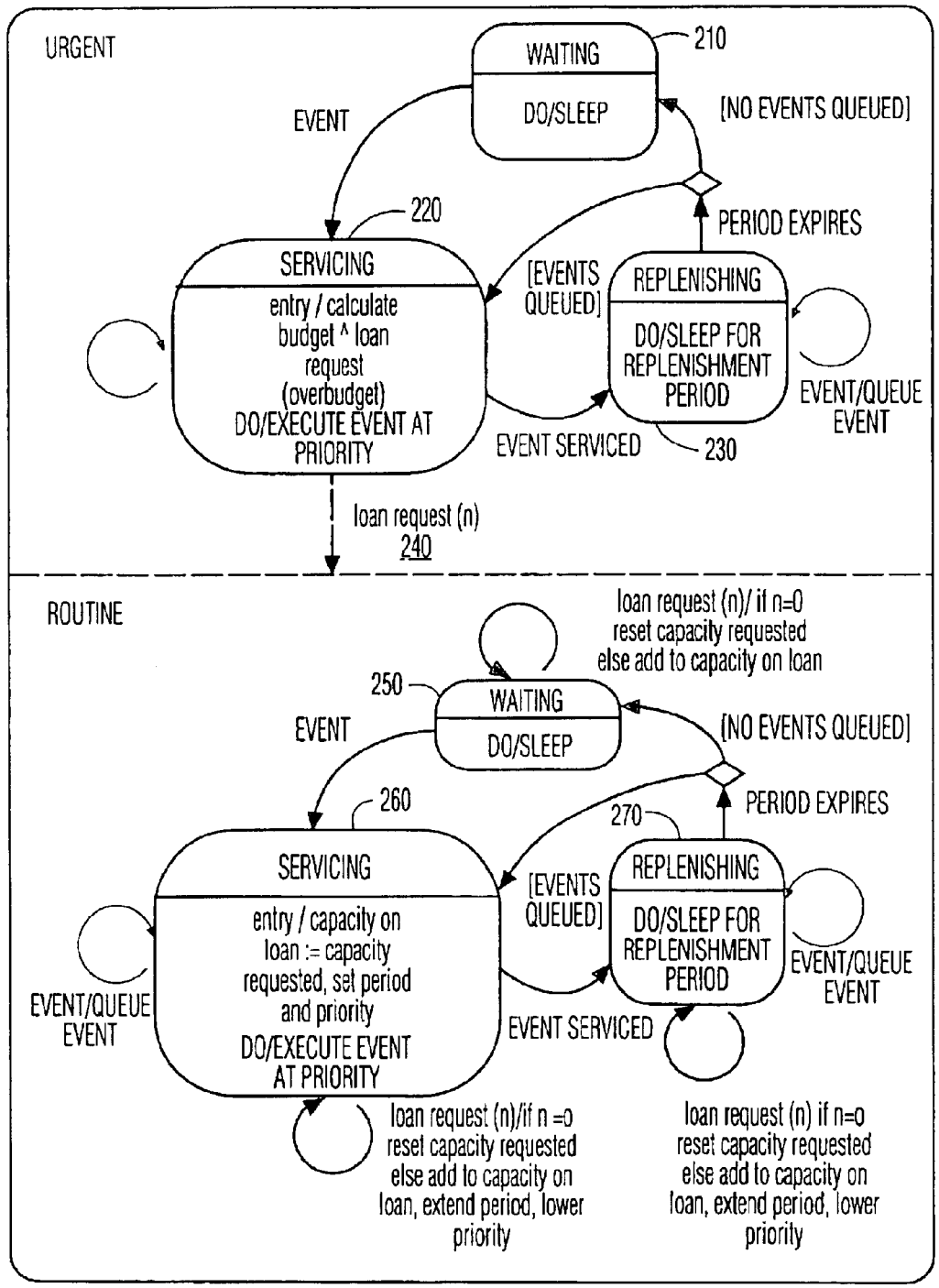
FIG. 2 illustrates a state diagram of the capacity loaning process of FIG. 1.

FIG. 2 illustrates a state diagram of the capacity loaning process 200. As shown in FIG. 2, each task is modeled here as a sporadic server, with modifications due to the capacity loan algorithm shown in bold type. For a discussion of the UML notations used herein, see, for example, UML Notation Guide, version 1.1 (Sep. 1, 1997), downloadable from http://www.omg.org/docs/ad/97-08-05.pdf, and incorporated by reference herein.

The capacity loaning process 200 utilizes two assumptions. First, the amount of borrowed time required by the urgent task will be known at the beginning of the execution period of the task. This implies that each event must be marked with its worst-case execution time so a dynamic assessment of budget can be made by the task at runtime. Secondly, the loan is only viable during the period of the borrower.

At system initialization, both tasks must agree on the maximum capacity that will be made available to loan. Using Equation (4), the routine task would compute the maximum amount of execution time to loan based on its original execution budget and a limiting factor to prevent an unbounded rise in its period. This loanable amount would then be registered with the urgent task, which would then compute the maximum amount of execution time it may borrow with Equation (2) (accounting for the differences in the loan amount due to the differing period of the two tasks).

At the beginning of each execution period, the urgent task computes the amount of execution time over budget during state 220 and sends a message 240 to the routine task containing this amount (which may be 0, in the event that it is not over budget). The urgent task then executes these events normally during state 220.

Because the loan is only viable during the period of the borrower, the routine task maintains two state variables. The amount of capacity requested is the amount of execution time that has yet to be acted on. That is, this borrowed time has not yet degraded the performance of the loaner. The amount of capacity on loan is borrowed time that is currently acting to degrade the loaner. The action of the routine task in response to the message 240 from the urgent task depends on the task's current state. While waiting during state 250, the overbudget amount from the urgent task is applied to capacity requested. Otherwise, the overbudget amount is added to capacity on loan, where it is then used with Equation (3) to set a new period for the task. The priority of the task must also be lowered to match the new task period. At the beginning of the execution period of the routine task during state 260, capacity on loan is set from capacity requested, and Equation (3) is used to compute the task's period. Whenever the period of the task is changed, the corresponding priority must be changed accordingly, to satisfy the Rate Monotonic scheduling algorithm.

It is to be understood that the embodiments and variations shown and described herein are merely illustrative of the principles of this invention and that various modifications may be implemented by those skilled in the art without departing from the scope and spirit of the invention.

What is claimed is:

1. A method for sharing execution capacity among tasks executing in a real-time computing system having a performance specification in accordance with Rate Monotonic Analysis (RMA), comprising the steps of:

pairing a higher priority task with a lower priority task;

reallocating by borrowing execution time from the lower priority task and reallocating it to the higher priority task during an overload condition;

increasing the period of the lower priority task to compensate for said reallocated execution time; and limiting an amount of execution time, Nr, to borrow from said lower priority task, task$_r$, to a maximum loan amount where Nr<<Cr, where
   $C_r$=worst-case task execution time of task$_r$, and
   $N_r$=amount of execution time to borrow from task$_r$.

2. The method of claim 1, wherein an amount of said execution time available to loan from said lower priority task (hereinafter "task$_r$") to said higher priority task (hereinafter "task$_u$") is obtained as follows:

$$Nu = \frac{Nr \cdot Tu}{Tr}$$

where,
   $N_r$=amount of execution time to borrow from task$_r$, where $N_r$<$C_r$,
   $T_r$=period of task$_r$,
   $C_r$=worst-case task execution time of task$_r$, and
   $T_U$=period of task$_U$.

3. The method of claim 1, wherein said increased period of the lower priority task, task$_r$, is obtained as follows:

$$Tn = \frac{Cr \cdot Tr}{Cr - Nr}$$

where
   $C_r$=worst-case task execution time of task$_r$,
   $T_r$=period of task$_r$, and
   $N_r$=amount of execution time to borrow from task$_r$, where $N_r$<$C_r$.

4. The method of claim 1, wherein a maximum execution time, Nm, that may be borrowed from said lower priority task, task$_r$, is obtained as follows:

$$Nm = Cr\left(1 - \frac{1}{m}\right)$$

where m is the multiple of the period of said lower priority task, task$_r$.

5. The method of claim 1, wherein said higher priority task has hard deadlines.

6. The method of claim 1, wherein said lower priority task has soft deadlines.

7. A method for allocating resources among tasks executing in a real-time computing system having a performance specification in accordance with Rate Monotonic Analysis (RMA), comprising the steps of:

pairing a higher priority task with a lower priority task;

providing a first resource allocation to said lower priority task during a normal operating condition;

reallocating by borrowing a portion of said first resource allocation from said lower priority task and reallocating to said higher priority task when said higher priority task is operable; and limiting an amount of execution time, Nr, to reallocate from said lower priority task, task$_r$, to a maximum loan amount where Nr<<Cr, where
   $C_r$=worst-case task execution time of task$_r$, and
   $N_r$=amount of execution time to borrow from task$_r$.

8. The method of claim 7, wherein said reallocated portion of said first resource allocation is obtained as follows:

$$Nu = \frac{Nr \cdot Tu}{Tr}$$

where,
   $N_r$=amount of execution time to borrow from task$_r$, where $N_r$<$C_r$,
   $T_r$=period of the lower priority task ("task$_r$"),
   $C_r$=worst-case task execution time of task$_r$, and
   $T_u$=period of the higher priority task ("task$_u$").

9. The method of claim 7, further comprising the step of increasing a period of said lower priority task, task$_r$, as follows:

$$Tn = \frac{Cr \cdot Tr}{Cr - Nr}$$

where
   $C_r$=worst-case task execution time of task$_r$,
   $T_r$=period of task$_r$, and
   $N_r$=amount of execution time to borrow from task$_r$, where $N_r$<$C_r$.

10. The method of claim 7, wherein a maximum execution time, Nm, that may be borrowed from said lower priority task, task$_r$, is obtained as follows:

$$Nm = Cr\left(1 - \frac{1}{m}\right)$$

where m is the multiple of the period of said lower priority task, task$_r$.

11. The method of claim 7, wherein said higher priority task has hard deadlines.

12. The method of claim 7, wherein said lower priority task has soft deadlines.

13. A method for sharing execution capacity among tasks executing in a real-time computing system having a performance specification in accordance with Rate Monotonic Analysis (RMA), comprising the steps of:
  pairing a higher priority task, task$_u$, with a lower priority task, task$_r$;
  reallocating by borrowing execution time from the lower priority task and reallocating to the higher priority task during an overload condition;
  increasing the utilization of said higher priority task; and
  decreasing the utilization of said lower priority task in a proportional manner to maintain a constant utilization, U; and
  limiting an amount of execution time, Nr, to borrow from said lower priority task, task$_r$, to a maximum loan amount where Nr<<Cr, where
    C$_r$=worst-case task execution time of task$_r$, and
    N$_r$=amount of execution time to borrow from task$_r$.

14. The method of claim 13, wherein said utilizations of said tasks are varied as follows:

$$\frac{Cu}{Tu} + \frac{Cr}{Tr} = U$$

where,
  C$_u$=worst-case task execution time of task$_u$,
  T$_u$=period of task$_u$,
  C$_r$=worst-case task execution time of task$_r$,
  T$_r$=period of task$_r$, and
  U=utilization for both tasks.

15. The method of claim 13, wherein an amount of said execution time available to reallocate from said lower priority task (hereinafter "task$_r$") to said higher priority task (hereinafter "task$_u$") is obtained as follows:

$$Nu = \frac{Nr \cdot Tu}{Tr}$$

where,
  N$_r$=amount of execution time to borrow from task$_r$, where N$_r$<C$_r$.
  T$_r$=period of task$_r$,
  C$_r$=worst-case task execution time of task$_r$, and
  T$_U$=period of task$_U$.

16. The method of claim 13, further comprising the step of increasing a period of the lower priority task, task$_r$, as follows:

$$Tn = \frac{Cr \cdot Tr}{Cr - Nr}$$

where
  C$_r$=worst-case task execution time of task$_r$,
  T$_r$=period of task$_r$, and
  N$_r$=amount of execution time to borrow from task$_r$, where N$_r$<C$_r$.

17. The method of claim 13, wherein a maximum execution time, Nm, that may be borrowed from said lower priority task, task$_r$, is obtained as follows:

$$Nm = Cr\left(1 - \frac{1}{m}\right)$$

where m is the multiple of the period of said lower priority task, task$_r$.

18. The method of claim 13, wherein said higher priority task has hard deadlines.

19. The method of claim 13, wherein said lower priority task has soft deadlines.

* * * * *